US006644702B2

(12) United States Patent
Liou

(10) Patent No.: US 6,644,702 B2
(45) Date of Patent: Nov. 11, 2003

(54) COMBINATION OF TOOL BIT WITH HANDLE

(76) Inventor: Mou-Tang Liou, No. 57, Kung Yeh North Road, Nan Kang Industrial Park, Nantou Hsien (TW)

(*) Notice: Subject to any disclaimer, the term of this patent is extended or adjusted under 35 U.S.C. 154(b) by 0 days.

(21) Appl. No.: 10/118,287

(22) Filed: Apr. 8, 2002

(65) Prior Publication Data

US 2003/0025345 A1 Feb. 6, 2003

(30) Foreign Application Priority Data

Jul. 31, 2001 (TW) .................................... 90118852 A

(51) Int. Cl.[7] .............................. A01B 1/22; B25G 3/12
(52) U.S. Cl. ......................... 294/57; 16/422; 403/322.2
(58) Field of Search ............................. 294/49, 51, 57, 294/59; 172/372, 373, 375; 15/145; 7/167; 403/358, 322.2, 322.3; 16/422

(56) References Cited

U.S. PATENT DOCUMENTS

| | | | | | |
|---|---|---|---|---|---|
| 2,031,044 | A | * | 2/1936 | Jensen et al. | 294/61 |
| 2,682,414 | A | * | 6/1954 | Richardson | 279/77 |
| 3,787,972 | A | * | 1/1974 | Carossino | 30/317 |
| 4,011,657 | A | * | 3/1977 | Vance | 30/337 |
| 4,406,559 | A | * | 9/1983 | Geertsema et al. | 403/287 |
| 5,425,226 | A | * | 6/1995 | Kaufman | 56/400.06 |
| 5,477,929 | A | * | 12/1995 | Kenyon et al. | 172/372 |
| 5,685,208 | A | * | 11/1997 | Tidwell | 81/177.85 |

* cited by examiner

*Primary Examiner*—Dean J. Kramer
(74) *Attorney, Agent, or Firm*—Alan D. Kamrath; Rider Bennett, LLP.

(57) ABSTRACT

A tool includes a tool bit and a handle. The tool bit includes a shank formed at an end thereof. The handle includes a joint formed at an end thereof for connection with the shank of the tool bit in a releasable manner. The joint defines a space for receiving the shank of the tool bit. The shank of the tool bit defines at least one recess. The joint includes at least one ball that can partially enter the at least one recess defined in the shank of the tool bit.

4 Claims, 7 Drawing Sheets

COMBINATION OF TOOL BIT WITH HANDLE

BACKGROUND OF THE INVENTION

1. Field of Invention

The present invention is related to a tool and more particularly to a tool including a handle for connection with a tool bit in a releasable manner.

2. Related Prior Art

There have been various gardening tools such as shovels and rakes. Conventionally, such a tool includes a tool bit and a handle. Generally, the tool bit includes an insert extending from an edge thereof. The insert of the tool bit is inserted in the handle that is made of wood or plastics. Sometimes, the tool bit is merged with the handle. Such a tool requires a large space for storage thereof since the handle extends from the tool bit.

There has been a foldable tool consisting a tool bit and a handle connected with the tool bit in a foldable manner. The handle is extended from the tool bit in use. The tool bit and the handle can be folded for storage. The foldable tool requires a small space for storage thereof. Each tool bit is securely connected with a specific handle. Therefore, two tools, such as a shovel and a rake, include two handles. However, two handles are more than a single user needs for he or she does not use two tools at the same time.

The present invention is therefore intended to obviate or at least alleviate the problems encountered in the prior art.

SUMMARY OF THE INVENTION

It is an objective of the present invention to provide a tool including a handle for connection with a tool bit in a releasable manner.

It is an objective of the present invention to provide a tool assembly including a handle for selective connection with one of many tool bits in a releasable manner.

According to the present invention, a tool includes a tool bit and a handle. The tool bit includes a shank formed at an end thereof. The handle includes a joint formed at an end thereof for connection with the shank of the tool bit in a releasable manner. The joint defines a space for receiving the shank of the tool bit. The shank of the tool bit defines at least one recess. The joint includes at least one ball that can partially enters the at least one recess defined in the shank of the tool bit.

The joint includes first and second plates separated from each other by the space. The second plate defines at least one hole in communication with the space. The at least one hole defined in the second plate receives the at least one ball, and includes an end of a reduced dimension so as to retain the at least one ball therein.

The second plate defines a tunnel in communication with the at least one hole. The rod can be inserted in the tunnel so as to push the at least one ball into engagement with the at least one recess defined in the shank of the tool bit.

The rod defines at least one recess with a slope. The at least one ball is partially received in the at least one recess defined in the rod for preventing escape of the rod from the joint. The rod can slide between a first position and a second position. In the first position, the slope pushes the at least one ball into engagement with the at least one recess defined in the shank of the tool bit. In the second position, the at least one ball falls in the at least one recess defined in the rod so as to completely leave the recess defined in the shank of the tool bit.

A spring may be mounted on the rod. The rod includes a head so that the spring is compressed between the joint and the head of the rod.

Other objectives, advantages, and novel features of the invention will become more apparent from the following detailed description when taken in conjunction with the accompanying drawings.

DETAILED DESCRIPTION OF PREFERRED EMBODIMENTS

Figure 1:
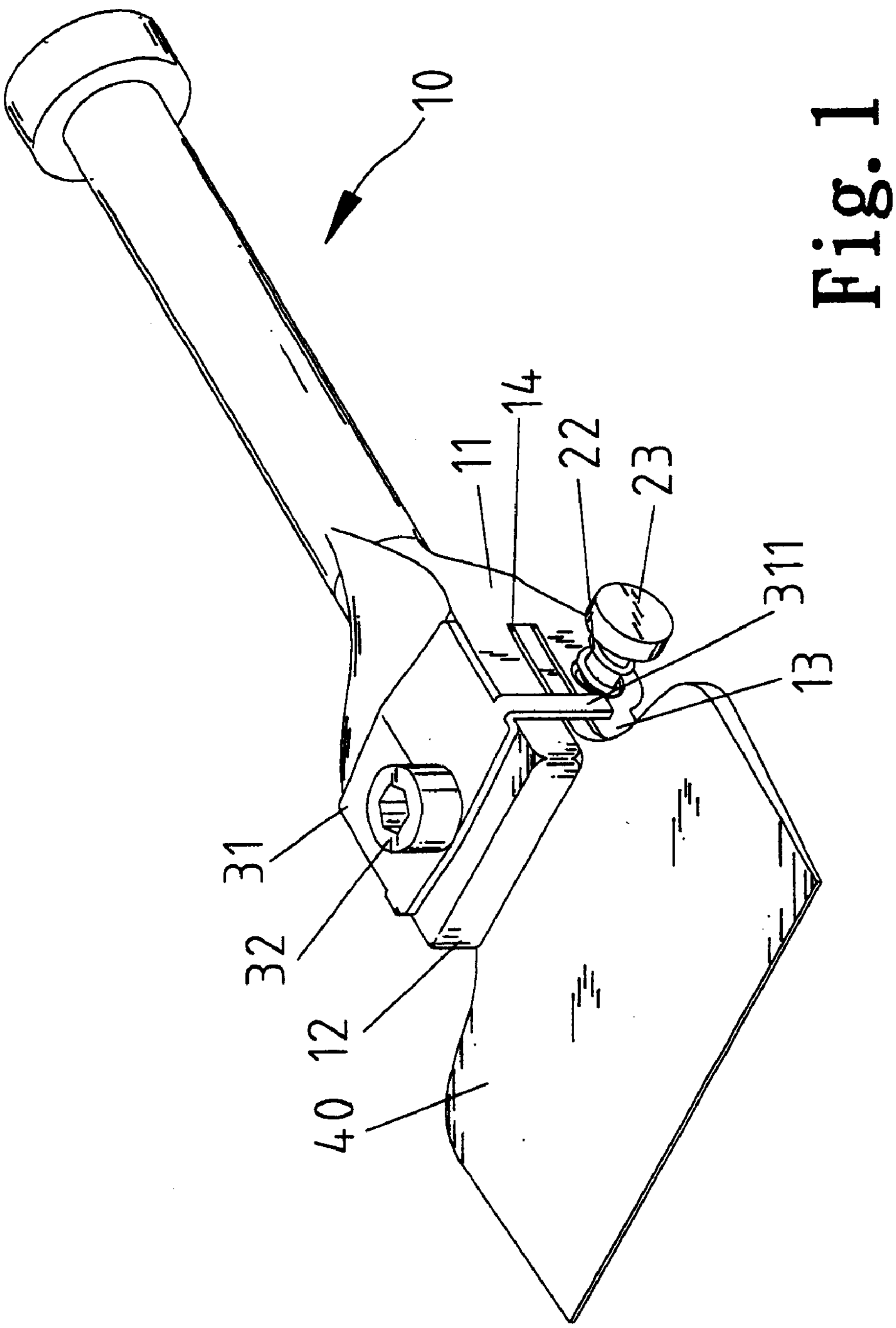
FIG. 1 is a perspective view of a tool including a handle for connecting with a tool bit in a releasable manner according to the present invention.
Figure 2:
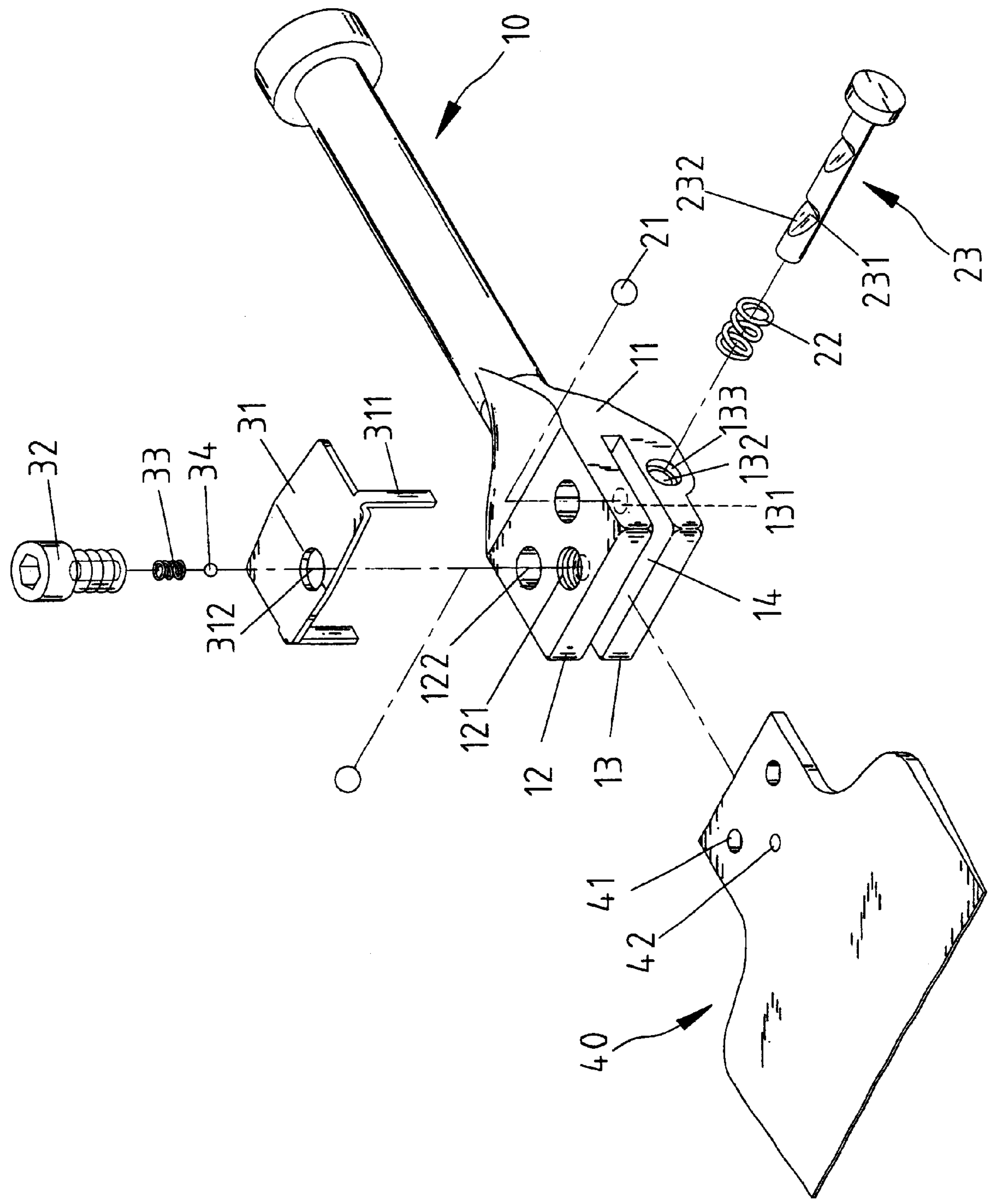
FIG. 2 is an exploded view of the tool shown in FIG. 1.
Figure 3:
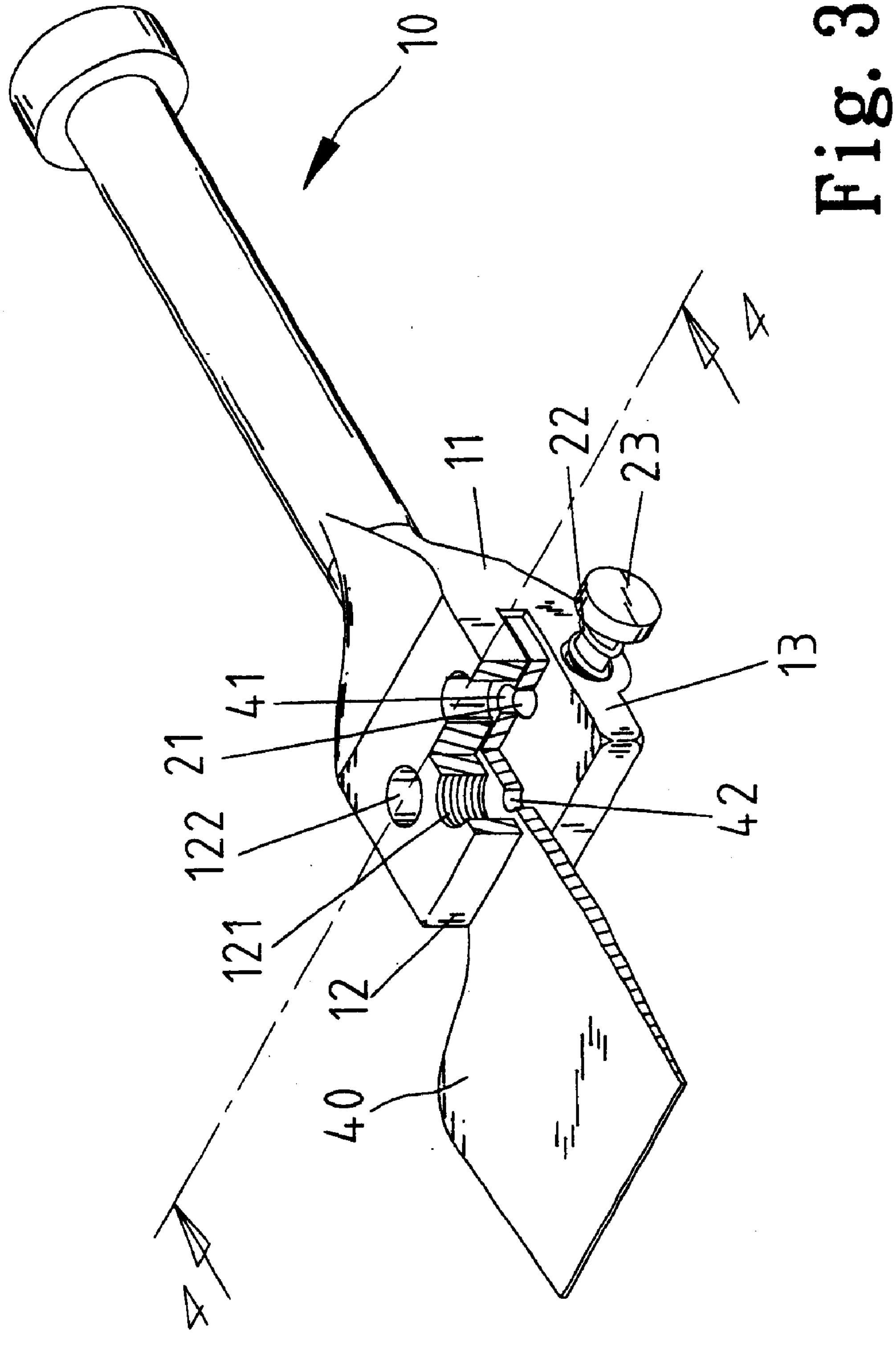
FIG. 3 is a perspective view of the tool shown in FIG. 1 without a cover.

Referring to FIGS. 1–5, according to the present invention, a tool includes a handle 10 for connection with a tool bit 40 in a releasable manner.

The handle 10 is formed with a joint 11 at an end thereof. The joint 11 includes a first plate 12 and a second plate 13 separated from each other by a gap 14 of a distance. The first plate 12 defines a threaded hole 121 and two holes 122.

The second plate 13 defines two holes 131 corresponding to the holes 122 defined in the first plate 12. The second plate 13 defines a tunnel 132 in communication with the holes 131. The second plate 13 defines a recess 133 of a greater diameter than that of the tunnel 132.

A cover 31 includes two extensions 311 projecting perpendicular thereto. A hole 312 is defined in the cover 31. A threaded bolt 32 is inserted through the hole 312 for engagement with the threaded hole 121, thus retaining the ball 34 in the threaded hole 121. Furthermore, the cover 31 is securely mounted on the first plate 12 by means of the threaded bolt 32 engaged with the threaded hole 121. The holes 122 are closed by means of the cover 31.

A rod 23 includes an enlarged head (not numbered) formed at an end thereof. The rod 23 defines two notches 231 each including a slope 232.

Figure 5:
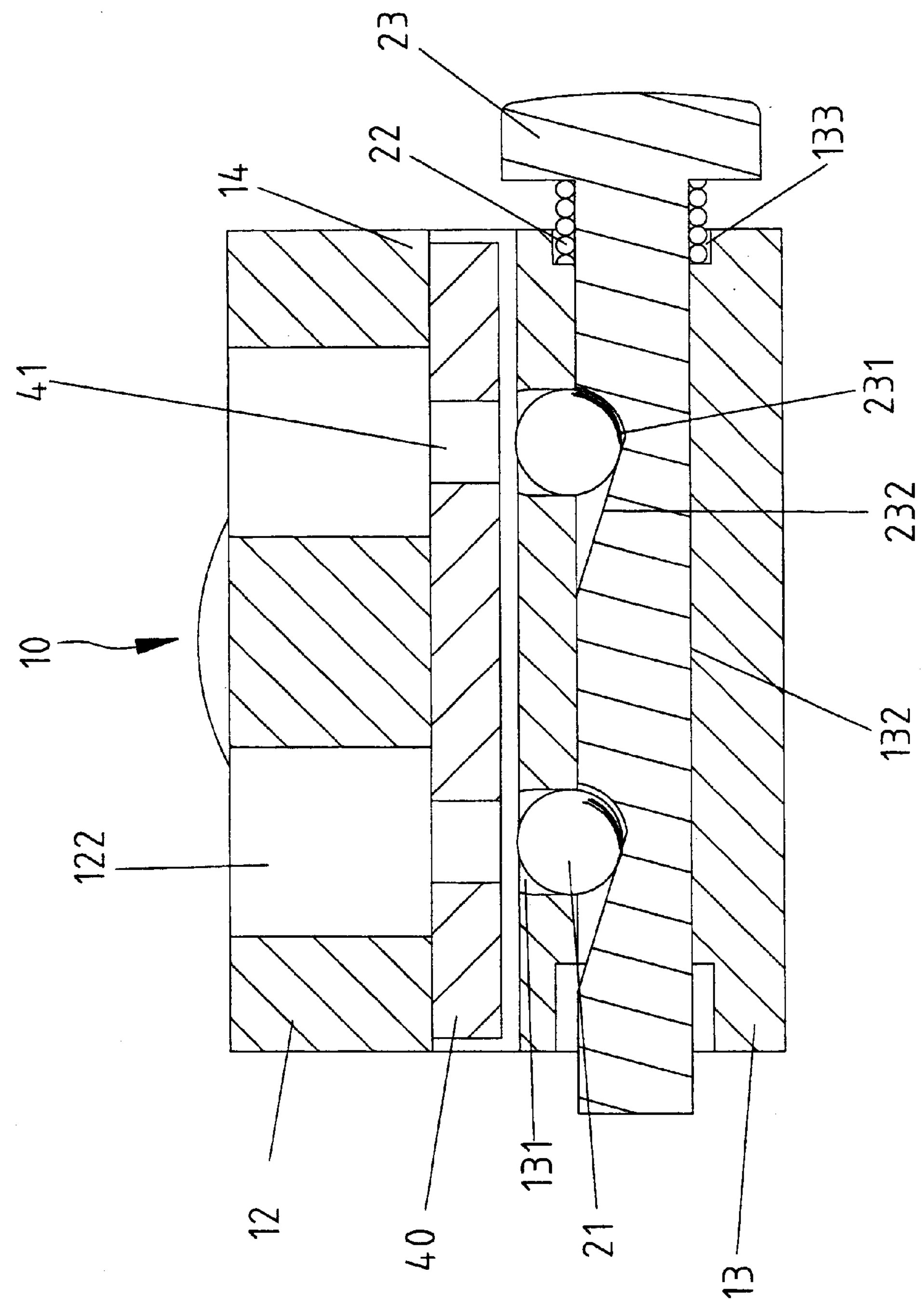
FIG. 5 is similar to FIG. 4 except for showing the tool in another position.

In assembly, the spring 22 is mounted on the rod 23. The rod 23 is inserted in the tunnel 132 so that the notches 231 are aligned with the holes 131 as shown in FIG. 5. Thus, two balls 21 can be put in the holes 131 through the holes 122. A tool (not shown) can be inserted through each of the holes 122 in order to press an annular edge at an upper end of one of the holes 131 in order to make its diameter smaller than that of the balls 21. Thus, escape of the balls 21 from the holes 131 is prevented. An end of the spring 22 is received in the recess 133.

Figure 4:
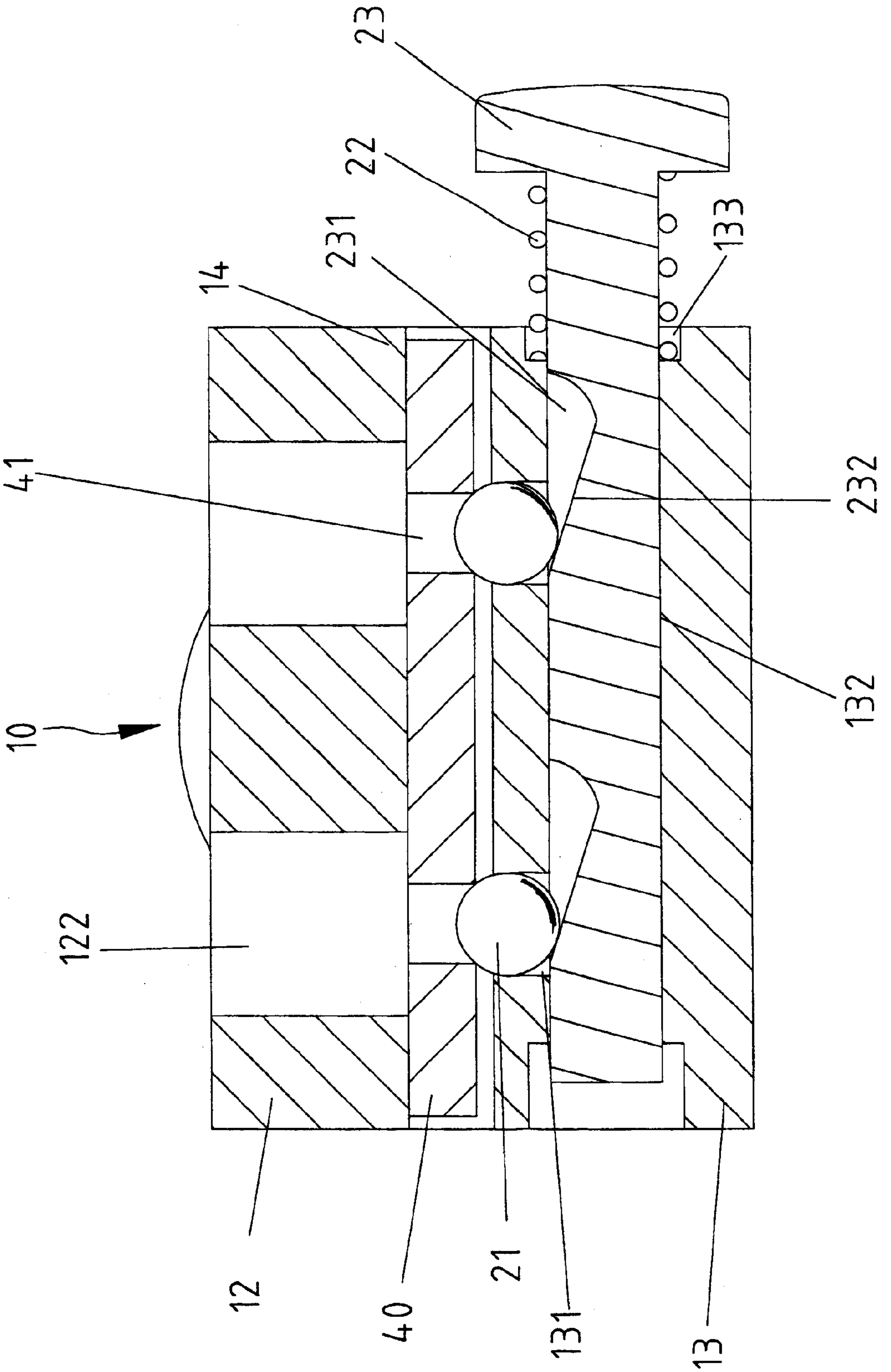
FIG. 4 is a cross-sectional view taken along a line 4—4 in FIG. 3.

The spring 22 is compressed between the second plate 13 and the head of the rod 23 for biasing the rod 23 away from the second plate 13. As shown in FIG. 4, a portion of each of the balls 21 remains in one of the notches 231, thus preventing escape of the rod 23 from the tunnel 132.

The threaded bolt 32 defines a recess (not numbered) in which a spring 33 and a ball 34 are embedded so that they cannot escape from the threaded bolt 32. A portion of the ball 34 can be exposed to the external of the recess defined in the threaded bolt 32. The threaded bolt 32 is inserted through the hole 312 for engagement with the threaded hole 121.

In use, the rod 23 is moved from the position shown in FIG. 4 to the position shown in FIG. 5 so that the balls 21 fall in the notches 231 and that the balls 21 are completely moved from the gap 14 between the plates 12 and 13. Thus, a shank (not numbered) of a tool bit 40 can be inserted in the gap 14 between the plates 12 and 13. The shank of the tool bit 40 defines two holes 41. A recess 42 is defined in an upper surface of the shank of the tool bit 40. When the holes 41 are aligned with the holes 131, the rod 23 is released so that the spring 22 pushes the rod 23 back to the position shown in FIG. 4. The slopes 232 push the balls 21 upward so that each of the balls 21 partially enters one of the holes 41, thus holding the shank of the tool bit 40.

Figure 6:
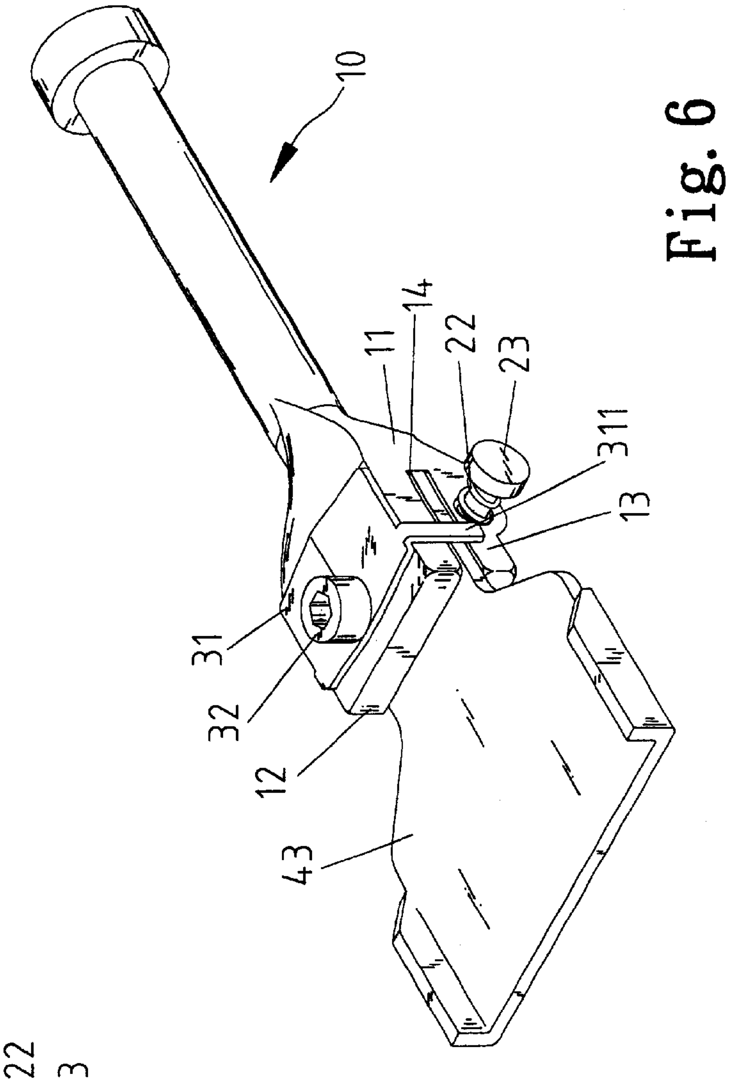
FIGS. 6–9 are perspective views of a handle engaged with various tool bits.
Figure 7:
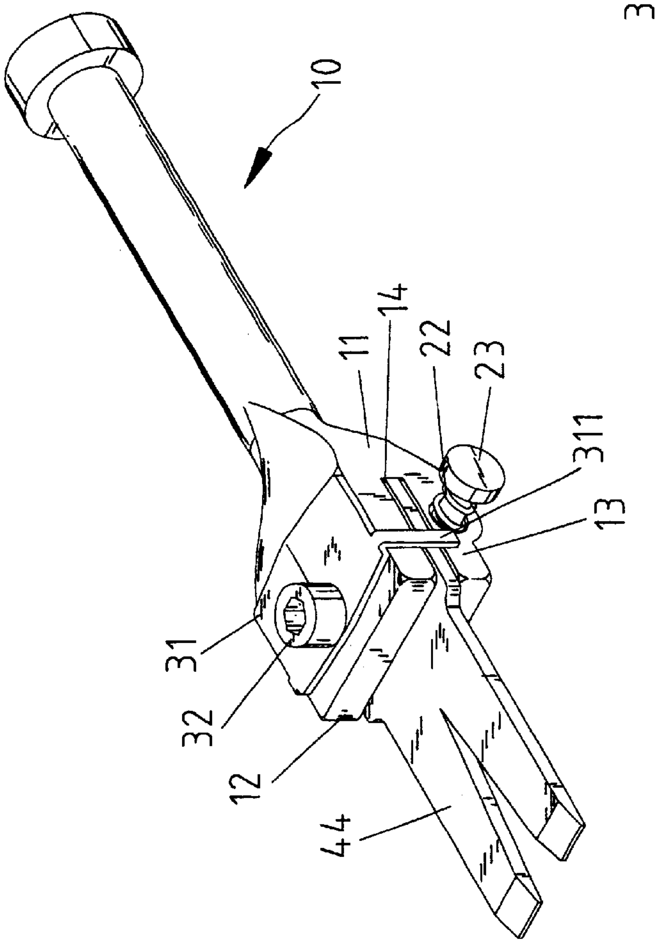
Figure 8:
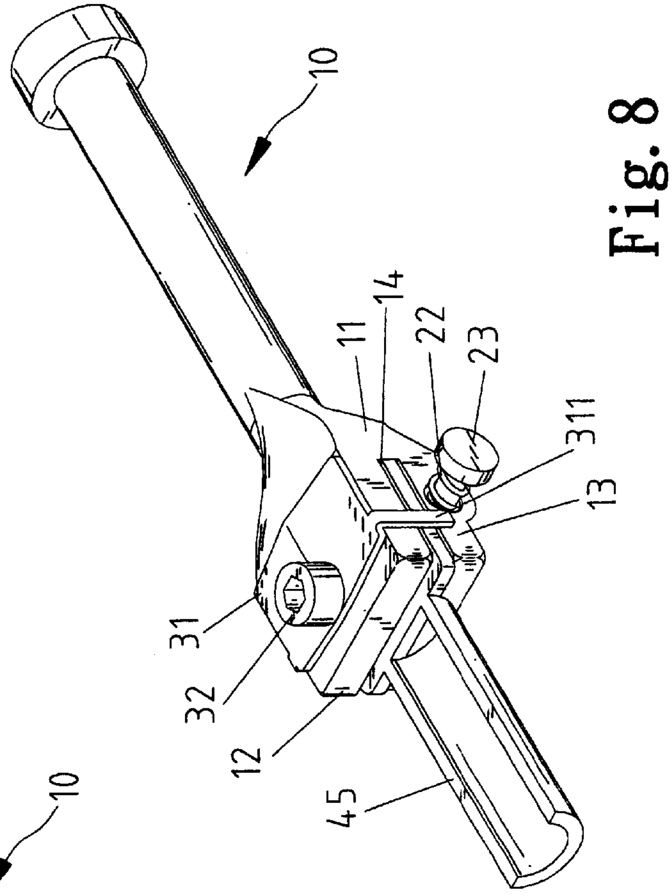
Figure 9:
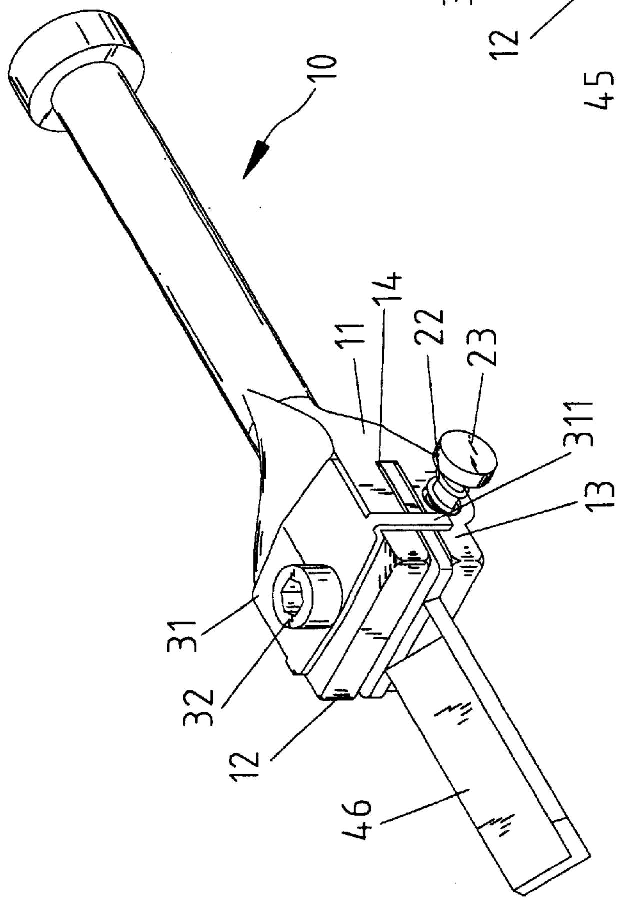

The rod 23 can be moved from the position shown in FIG. 4 to the position shown in FIG. 5 in order to release the tool bit 40 for replacement with a tool bit 43 shown in FIG. 6, a tool bit 44 shown in FIG. 7, a tool bit 45 shown in FIG. 8 or a tool bit 46 shown in FIG. 9.

The preferred embodiment of the present invention has been described in detail for illustration of the present invention. Those skilled in the art can derive a lot of variations from these embodiments. Therefore, these embodiments shall not limit the scope of the present invention that can only be defined in the attached claims.

What is claimed is:

1. A tool including:

a tool bit including a shank formed at an end thereof, with the shank of the tool bit defining at least one recess; and a handle including a joint formed at an end thereof for connection with the shank of the tool bit in a releasable manner, with the joint defining a space for receiving the shank of the tool bit, with the joint including at least one ball that can partially enter the at least one recess defined in the shank of the tool bit, with the joint including first and second plates separated from each other by the space, with the second plate defining at least one hole in communication with the space to receive the at least one ball, with the second plate including a tunnel communicating with the at least one hole;

a rod having a head, with the rod inserted in the tunnel in order to push the at least one ball into engagement with the at least one recess defined in the shank of the tool bit, wherein the rod defines at least one recess, with the at least one ball partially received in the at least one recess defined in the rod for preventing escape of the rod from the joint, wherein the rod can slide between a first position where the at least one recess pushes the at least one ball into engagement with the at least one recess defined in the shank of the tool bit and a second position where the at least one ball falls in the at least one recess defined in the rod so as to completely leave the recess defined in the shank of the tool bit; and a spring mounted on the rod so that the spring is compressed between the joint and the head of the rod.

2. The tool according to claim 1 wherein the at least one hole includes an end of a reduced dimension so as to retain the at least one ball therein.

3. The tool according to claim 1 wherein the at least one recess includes a slope wherein the slope in the first position of the rod pushes the at least one ball into engagement with the at least one recess defined in the shank of the tool bit.

4. The tool according to claim 1 wherein the tool bit is a shovel.

* * * * *